(12) United States Patent
Park et al.

(10) Patent No.: US 8,192,509 B2
(45) Date of Patent: Jun. 5, 2012

(54) METHOD AND APPARATUS FOR PRODUCTION OF DSSC

(75) Inventors: Chun-Seong Park, Gyeonggi-Do (KR); Jong Min Kim, Gyeonggi-Do (KR); Jung Min Hwang, Gyeonggi-Do (KR); Gang-Beom Kim, Chungcheongnam-Do (KR); Jeong-Yong Eum, Chungcheongbuk-do (KR); Hyun-Seung Cho, Daegu (KR)

(73) Assignees: DMS Co., Ltd., Suweon (KR); Sewon Co., Ltd., Wonju (KR)

( * ) Notice: Subject to any disclaimer, the term of this patent is extended or adjusted under 35 U.S.C. 154(b) by 150 days.

(21) Appl. No.: 12/661,411

(22) Filed: Mar. 15, 2010

(65) Prior Publication Data

US 2010/0230046 A1    Sep. 16, 2010

(30) Foreign Application Priority Data

Mar. 13, 2009    (KR) .................. 10-2009-0021406

(51) Int. Cl.
*H01L 21/00*    (2006.01)

(52) U.S. Cl. ........................................ 29/25.01; 438/57

(58) Field of Classification Search .................. 29/25.01; 438/57, 88–90
See application file for complete search history.

(56) References Cited

U.S. PATENT DOCUMENTS

2011/0132449 A1*    6/2011    Ramadas et al. .............. 136/256

FOREIGN PATENT DOCUMENTS

| CN | 101241956 A | 8/2008 |
|----|----|----|
| CN | 101354970 A | 1/2009 |

OTHER PUBLICATIONS

Chinese Office Action for Chinese Application No. 201010136226.6, issued Jul. 22, 2011.

* cited by examiner

*Primary Examiner* — Richard A. Booth
(74) *Attorney, Agent, or Firm* — Edwards Wildman Palmer LLP

(57) ABSTRACT

An apparatus and method for producing a dye-sensitized cell are provided, in which a pre-transparent electrode and an opposite electrode are partially bonded, dye molecules are applied to the bonded electrodes followed by washing, an electrolyte is injected, and then the electrodes are hermetically sealed. With the apparatus and method, the manufacturing cost can be reduced and the manufacturing process can be simplified.

2 Claims, 6 Drawing Sheets

FIG. 3 dye molecules solution / washing solution

METHOD AND APPARATUS FOR PRODUCTION OF DSSC

CROSS-REFERENCE TO RELATED APPLICATIONS

This application claims the benefit of Korean Patent Application No. 10-2009-21406, filed on Mar. 13, 2009, which is incorporated herein by reference in its entirety.

BACKGROUND (a) Technical Field

The present invention relates to a method and apparatus for making a dye-sensitized solar cell (DSSC).

(b) Background Art

One of the most promising new energy sources is solar energy. A silicon type solar cell has been proposed, but it requires high manufacturing cost and shows low economic efficiency. A DSSC has been proposed as an alternative, which requires low production cost while showing energy conversion efficiency comparable to such a silicon solar cell.

In general, the DSSC includes a semiconductor electrode (hereinafter "transparent electrode"), a counter electrode (hereinafter "opposite electrode") opposite to the transparent electrode, and an electrolyte layer formed between the two electrodes. The transparent electrode includes a transparent conductive substrate in which a transparent substrate is coated with a transparent electrical conductive film. The transparent conductive substrate is coated with porous oxide nanoparticles onto which photosensitive dye molecules are adsorbed. The dye molecules serve to collect solar light and create electron-hole pairs. The opposite electrode includes a transparent conductive substrate in which a transparent substrate is coated with a transparent electrical conductive film. The transparent conductive substrate is coated with platinum or carbon.

Typically, such a DSSC is manufactured as follows. A transparent electrode and an opposite electrode are provided. They are then laminated and bonded so as to allow a predetermined interval to be maintained therebetween. An electrolyte layer is then filled in a space defined between the two electrodes. Thereafter, the bonded electrodes are hermetically sealed.

According to a conventional method, the transparent electrode is prepared by the following method. That is, porous oxide (for example, $TiO_2$) nanoparticles are coated on a transparent conductive substrate. The coated substrate is immersed and fixed in a dye solution in which photosensitive dye molecules are dissolved. Then, the substrate is washed and dried.

The conventional method, however, entails problems. For example, since the transparent conductive substrate coated with porous oxide nanoparticles thereon is soaked and fixed in the dye solution, followed by washing/drying, the process is complicated and takes a long time to be completed. In addition, since the entire substrate has to be immersed in the dye solution, a considerable amount of dye solution more than necessary is used, which results in a waste of materials and requires a larger equipment (solution tank). Further, the adsorbed dye molecules may be separated from the substrate by a shock or a scratch in the middle of manipulating the transparent electrode to laminate the transparent electrode and the opposite electrode. Moreover, in the process of bonding the transparent electrode and the opposite electrode, it is necessary to perform a high-temperature treatment, which may decompose the dye molecules.

The above information disclosed in this Background section is only for enhancement of understanding of the background of the invention and therefore it may contain information that does not form the prior art that is already known in this country to a person of ordinary skill in the art.

SUMMARY

In one aspect, the present invention provides methods for making a DSSC. In one embodiment, the DSSC is prepared as follows. A pre-transparent electrode is provided by coating oxide nanoparticles on a transparent conductive substrate and sintering the resulting transparent conductive substrate. An opposite electrode is provided by coating a transparent conductive substrate with platinum or carbon. Then, the pre-transparent electrode and the opposite electrode are laminated such that the two electrodes are spaced apart by a predetermined interval from each other with the coated oxide nanoparticles and the coated platinum or carbon positioned between the two electrodes. The two electrodes are partially bonded. That is, they are bonded at one or more predetermined portions such that the space between the two electrodes is in fluid communication with the outside. Photosensitive dye molecules are supplied to the space between the two electrodes such that the photosensitive dye molecules are adsorbed onto the oxide nanoparticles. An electrolyte is supplied into the space between the two electrodes. Thereafter, the electrodes are hermetically sealed.

In another aspect, the present invention provides apparatuses for producing a dye-sensitized solar cell performing the methods described above and below. An apparatus according to certain embodiments includes a container having outer walls on which at least one first opening and at least one second opening are formed and accommodating a liquid at a first position or positions therein, at least one pair of bonded electrodes at a second position or positions therein, and a solution transfer unit at a third position or positions therein. It also includes a circulation unit connected to the solution transfer unit through the first opening or openings of the container and to the liquid accommodated in the container through the second opening or openings of the container for circulating the liquid accommodated in the container to and from the solution transfer unit.

An apparatus according to other certain embodiments includes a container having outer walls on which at least one first opening and at least one second opening are formed and accommodating a liquid at a first position or positions therein, and a pre-cell panel unit at a second position or positions therein. The pre-cell panel unit comprises a front jig and a rear jig, and a pair of bonded electrodes between the front jig and the rear jig. The front jig has an opening formed at an upper portion thereof, and the rear jig is not formed with such an opening. The apparatus further includes a circulation unit connected to opening of the front jig of the pre-cell panel unit through the first opening or openings of the container and to the liquid accommodated in the container through the second opening or openings of the container for circulating the liquid accommodated in the container to and from the pre-cell panel unit.

In these embodiments, the pair or each of the pairs of bonded electrodes has a space between the electrodes, and the pair or each of the pairs of bonded electrodes has at least one opening at one distal end thereof and has at least one opening at the other distal end thereof.

As the kind of the electrode substrates, the kind and properties of the oxide nanoparticles, the kind and properties of the sensitized dyes, the structure of the opposite electrode, and the phase of the electrolyte, etc., are known in the art, detailed description will be omitted.

The term "pre-transparent electrode" used herein is referred to as a transparent electrode before photosensitive dye molecules are adsorbed onto the oxide nanoparticles thereof.

The term "pre-cell panel" used herein is a substrate in which a pre-transparent electrode and an opposite electrode are partially bonded.

The above and other features of the invention are described in detail infra.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIGS. 4a(A) and 4a(B) show the structure of an apparatus for producing a DSSC according to still other embodiments of the present invention;

DETAILED DESCRIPTION OF EMBODIMENTS

Hereinafter, the present invention will be described in further detail with reference to the accompanying drawings and examples. It is to be understood, however, that these drawings and examples are for illustrative purposes only and are not to be construed to limit or change the scope of the present invention. It will be obvious to a person skilled in the art that other various modifications and variations are possible within the scope of the present invention.

As discussed above, one aspect of the present invention provides a method for producing a DSSC which includes a transparent electrode, an opposite electrode opposite to the transparent electrode, and an electrolyte layer filled in a space defined therebetween.

According to an embodiment of the present invention, the method may comprise the steps of: (a) providing a pre-transparent electrode by coating oxide nanoparticles on a transparent conductive substrate and sintering the resulting transparent conductive substrate; (b) providing an opposite electrode by coating a transparent conductive substrate with platinum or carbon; (c) laminating the pre-transparent electrode and the opposite electrode such that the two electrodes are spaced apart by a predetermined interval from each other with the coated oxide nanoparticles and the coated platinum or carbon positioned between the two electrodes, and then bonding the two electrodes at one or more predetermined portions such that the space between the two electrodes is in fluid communication with the outside; (d) supplying photosensitive dye molecules to the space between the two electrodes such that the photosensitive dye molecules are adsorbed onto the oxide nanoparticles; (e) supplying an electrolyte into the space between the two electrodes; and (f) hermetically sealing the electrodes.

In certain embodiments, in step (c), the bonded portion or portions may have at least one first opening therein and at least one second opening therein. The space between the two electrodes is in fluid communication with the outside through the first opening(s) and the second opening(s). In this case, at least one of the first openings, at least one of the second openings, or both may be formed after the bonded portion or portions are formed. Alternatively, at least one of the first openings, at least one of the second openings, or both may be formed by not applying a bonding agent at predetermined positions corresponding to the openings.

In other embodiments, the step (d) may be performed by supplying a solution containing the photosensitive dye molecules. In this case, the dye solution may, suitably, be circulated in a vertical direction (e.g., from the top to the bottom or from the bottom to the top) or in a horizontal direction. With the circulation, a waste of the dye solution may be prevented and working efficiency may be enhanced. In addition, during the circulation, the concentration of the dye solution may be, suitably, adjusted to be constant.

In still other embodiments, the method may further comprise, prior to step (f), the step of removing remaining dye molecules that have not been adsorbed onto the oxide nanoparticles. In this case, preferably, the remaining photosensitive dye molecules may be removed by supplying a washing solution. Also preferably, the remaining washing solution may be removed by supplying air.

As discussed above, another aspect of the present invention provides an apparatus for producing a DSSC by performing the above-described methods and the methods described below.

An apparatus according an embodiment includes a container and a circulation unit. The container has outer walls on which at least one first opening and at least one second opening are formed. The container accommodates a liquid at a first position or positions therein, at least one pair of bonded electrodes at a second position or positions therein, and a solution transfer unit at a third position or positions therein. The circulation unit is connected to the solution transfer unit through the first opening or openings of the container and to the liquid accommodated in the container through the second opening or openings of the container. The circulation unit functions to circulate the liquid accommodated in the container to and from the solution transfer unit. In this case, the pair or each of the pairs of bonded electrodes has a space between the electrodes. Also, the pair or each of the pairs of bonded electrodes has at least one opening at one distal end thereof and has at least one opening at the other distal end thereof.

Preferably, the pair or pairs of bonded electrodes may be accommodated in the container vertically such that the solution transfer unit is positioned above the pair or pairs of bonded electrodes by a first predetermined distance and the pair or pairs of bonded electrodes are positioned above the liquid accommodated in the container by a second predetermined distance.

Preferably, the liquid may be transferred in top-to-bottom direction in the container such that the liquid is introduced into the space or spaces between the electrodes via the upper distal end opening or openings of the pair or pairs of bonded electrodes and the liquid is discharged out of the space or spaces via the lower distal end opening or openings of the pair or pairs of bonded electrodes.

The liquid may be a photosensitive dye solution, a washing solution, or both.

In a modified embodiment, the solution transfer unit may have outer walls defining an inner cavity therein, and the pair or pairs of bonded electrodes may be accommodated in the container vertically such that a bottom portion or portions of the solution transfer unit are water-tightly connected to an upper portion or portions of the pair or pairs of bonded electrodes with the upper distal end opening or openings of the pair or pairs of bonded electrodes positioned within the inner cavity of the solution transfer unit.

The liquid, preferably, may be transferred in top-to-bottom direction in the container such that the liquid is introduced into the space or spaces between the electrodes via the upper distal end opening or openings of the pair or pairs of bonded electrodes and the liquid is discharged out of the space or spaces via the lower distal end opening or openings of the pair or pairs of bonded electrodes. In this case, the lower distal end opening or openings of the pair or pairs of bonded electrodes may suitably be submerged in the liquid accommodated in the container.

In still another modified embodiment, the lower distal end opening or openings of the pair or pairs of bonded electrodes may be spaced from the liquid accommodated in the container, and wherein the liquid may be transferred in bottom-to-top direction in the container such that the liquid is introduced into the space or spaces between the electrodes via the lower distal end opening or openings of the pair or pairs of bonded electrodes and the liquid is discharged out of the space or spaces via the upper distal end opening or openings of the pair or pairs of bonded electrodes.

An apparatus according to another embodiment includes a container having outer walls on which at least one first opening and at least one second opening are formed. The container accommodates a liquid at a first position or positions therein and a pre-cell panel unit at a second position or positions therein. The pre-cell panel unit comprises a front jig and a rear jig, and a pair of bonded electrodes between the front jig and the rear jig, the front jig has an opening formed at an upper portion thereof, and the rear jig is not formed with such an opening. The apparatus further includes a circulation unit connected to opening of the front jig of the pre-cell panel unit through the first opening or openings of the container and to the liquid accommodated in the container through the second opening or openings of the container. The circulation unit functions to circulate the liquid accommodated in the container to and from the pre-cell panel unit.

In a modified embodiment, the pre-cell panel unit comprises pairs of bonded electrodes, each of which has a space between the electrodes and has at least one opening at one distal end thereof and has at least one opening at the other distal end thereof. The pre-cell panel unit further comprises a plurality of intermediate jigs between the front jig and the rear jig such that each of the pairs of bonded electrodes is positioned between two of the jigs. Each of the intermediate jigs has an aperture formed at an upper portion thereof such that when the jigs are assembled to form the pre-cell panel unit, the apertures are in fluid communication with the opening of the front jig and with the distal end openings of the pairs of bonded electrodes.

In certain embodiments, the solution transfer unit may be fabricated as a structure that allows all bonded electrodes to be simultaneously processed. Alternatively, it may be fabricated as structure that allows the bonded electrodes sequentially processed in a predetermined order.

In certain other embodiments, the solution transfer unit may be integrally formed with the container.

According to the present invention, after the pre-transparent electrode and the opposite electrode are bonded to each other, the photosensitive dye molecules are adsorbed onto the bonded electrodes. Thus, since the heat treatment prior to adsorption of the dye molecules hardly have an effect on the performance of a solar cell, it is not required to control the conditions for production of the solar cell, resulting in an increase in process efficiency. Furthermore, since the dye molecules adsorbing step, the washing step and electrolyte injecting step can be carried out in the same equipment, the process can be simplified and the manufacturing time can be reduced.

Methods and apparatuses for producing a DSSC according the present invention will be described in more detail with reference to FIGS. 1 to 4.

Figure 1:
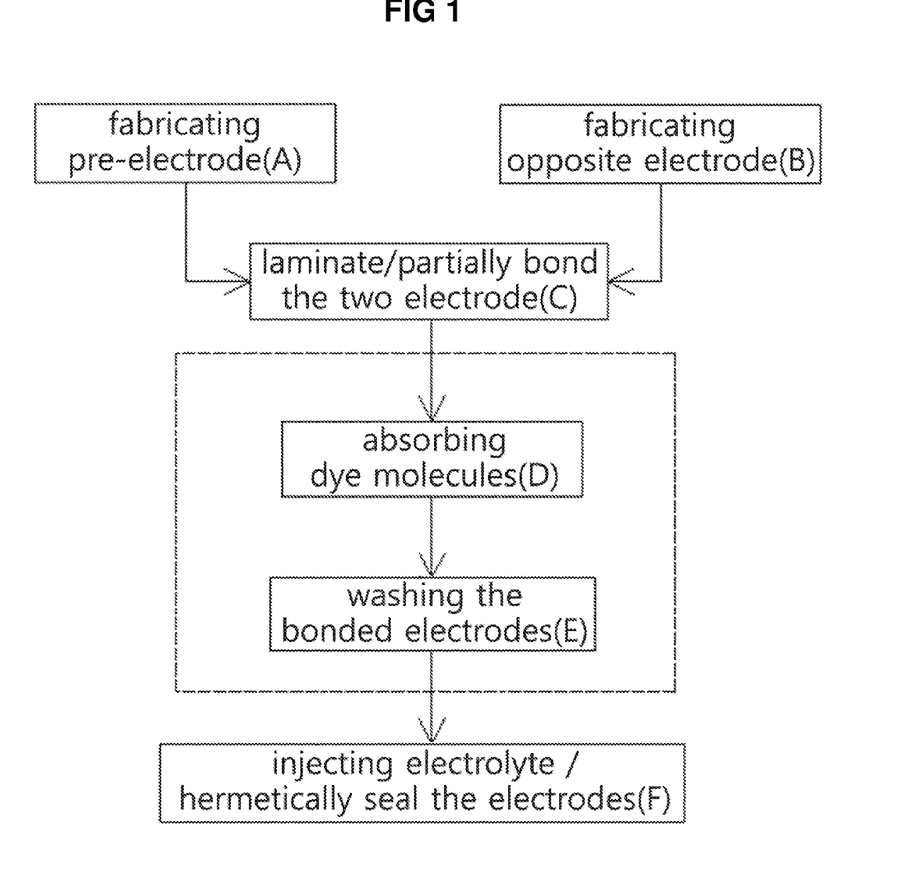
FIG. 1 is a flowchart illustrating a process of producing a dye-sensitized solar cell (DSSC) according to the present, invention.

FIG. 1 is a flowchart illustrating a process of producing a DSSC according to an embodiment of the present invention.

According to the method, a pre-transparent electrode is provided (A) and an opposite electrode is provided (B). The two electrodes are laminated and partially bonded (C). Dye molecules are then adsorbed (D). The inner surfaces of the pre-transparent electrode and the opposite electrode are washed (E). Thereafter, an electrolyte is injected between the bonded electrodes. Subsequently, the bonded electrodes are hermetically sealed (F).

In steps (A) and (B), a pre-transparent electrode and an opposite electrode are provided. According to the prior art, as discussed above, photosensitive dye molecules are adsorbed onto a transparent electrode, and then the resulting transparent electrode is laminated and bonded with an opposite electrode. According to the present invention, however, a pre-transparent electrode is laminated and bonded with an opposite electrode, and adsorption of photosensitive dye molecules is then performed.

In step (C), the pre-transparent electrode (substrate) and the opposite electrode (substrate) are laminated and partially bonded. In an embodiment, a bonding agent is taped to or coated on one of the two electrodes at a predetermined portion or portions, and then the electrodes are (symmetrically) laminated. Subsequently, the two electrodes are bonded to each other at the predetermined portion or portions thereof through, e.g., heat treatment, UV irradiation, laser radiation or the like.

In this case, the partially bonded electrodes may have at least two openings for allowing the space between the bonded electrodes to be in fluid communication with the outside. The number, size, and the position of the openings can be determined appropriately depending on specific design requirement. Also, the manner of making the openings may be determined appropriately depending on specific design requirement.

In an embodiment, the two or more openings are formed on the bonded portion or portions. For example, a first opening may be formed at a first distal end of the bonded portion and a second opening may be formed at a second distal end thereof. Preferably, the first and second distal ends may be the left and right distal ends. Also preferably, the first and second distal ends may be the upper and lower distal ends.

In another embodiment, at least one of the openings may be formed, by a suitable physico-chemical method, at a predetermined portion or portions of the electrodes after the electrodes are hermetically sealed.

In still another embodiment, a bonding agent is not applied to a predetermined position or portions where the opening(s) are to be formed, thereby making the opening(s).

As such, in step (C), a pre-cell panel having a plurality of openings is prepared.

In step (D), photosensitive dye molecules are supplied to the space between the electrodes. Preferably, a photosensitive dye solution is injected into the space between the bonded electrodes through one or a first group of the openings and is discharged to the outside through the other or a second group of the openings.

Figure 2:
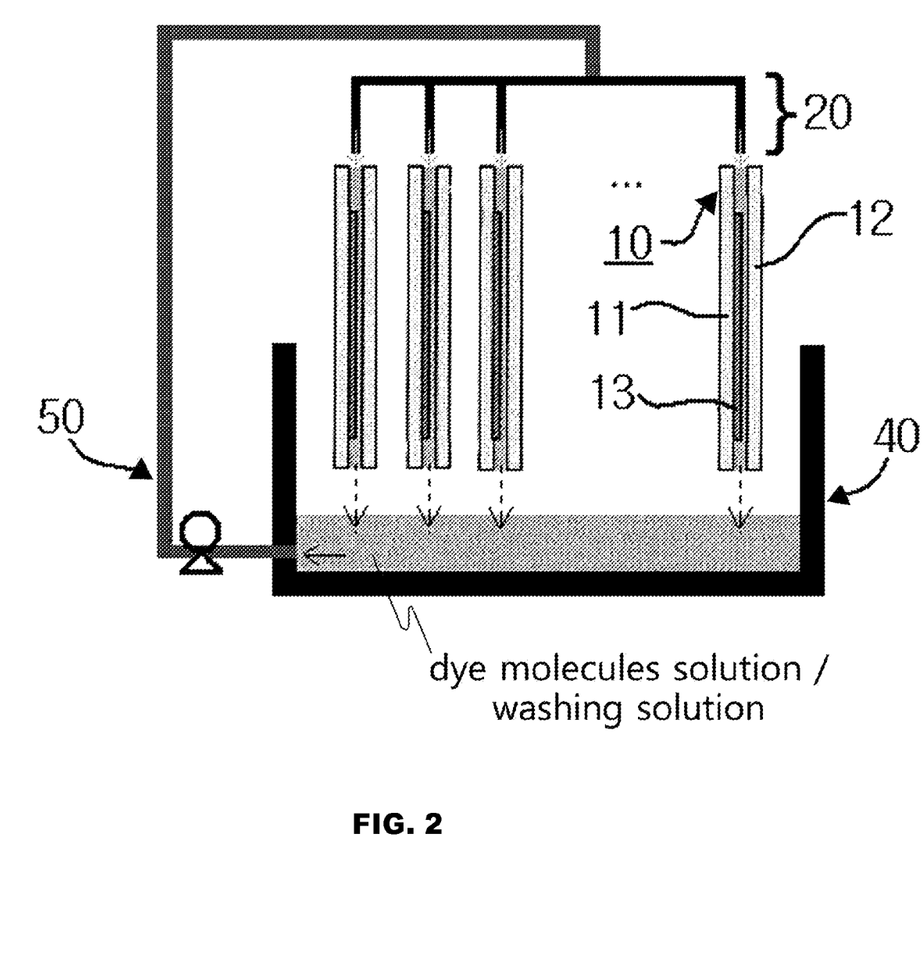
FIG. 2 shows the structure and operating state of an apparatus for producing a DSSC according to an embodiment of the present invention.
Figure 3:
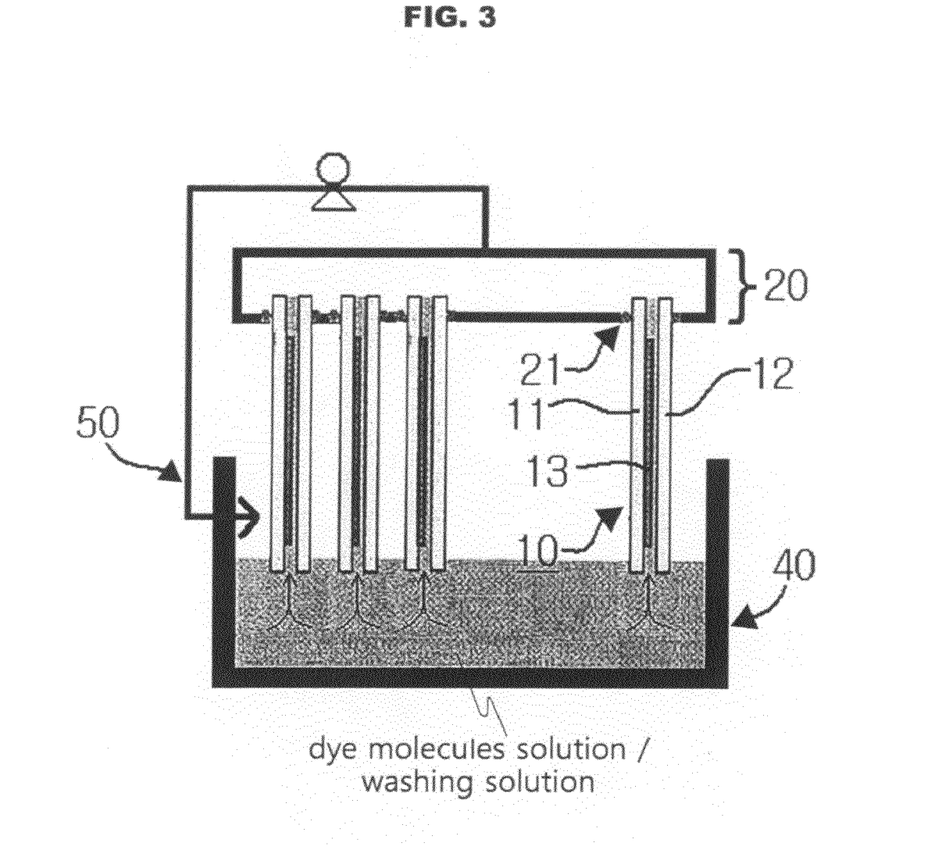
FIG. 3 shows the structure and operating state of an apparatus for producing a DSSC according to another embodiment of the present invention.

Depending on the design choice, the dye solution can be flowed vertically (FIGS. 2 and 3) or horizontally (not shown). A (vacuum) pump, a dispenser, and the like can be used. In an embodiment, as shown in FIG. 2, the dye solution may be introduced into the spaces between the electrodes via the upper end openings of the electrodes. In another embodiment, as shown in FIG. 3, each of the upper end openings may be air-tightly connected to the solution transfer unit 20, thereby avoiding wasting the dye solution.

The concentration of the dye solution may be determined appropriately.

In step (E), dye molecules that have not been adsorbed onto the oxide nanoparticles are removed. This step may be performed by, e.g., supplying a washing solution, a dry air, or combination thereof. The washing solution and dry air may be introduced and discharged through the openings of the bonded electrodes. The order of supplying the washing solution and dry air is not limited to a specific one and can be adjusted.

In step (F), an electrolyte is supplied into the space between the bonded electrodes. If the electrolyte filled between the electrodes is leaked out and/or external air or moisture can be introduced into the electrodes, the quality of the DSSC may be degraded. Accordingly, once the electrolyte is supplied to the space through the openings of the bonded electrodes, the openings should be hermetically sealed. For the hermetic sealing, any known applicable method can be used. For example, a bonding agent such as a thermoplastic resin film, a thermosetting or UV curable resin, a glass paste composition or the like may be applied, or UV irradiation, laser radiation or the like may be used.

In an embodiment, for the sake of convenience of injection, at least one of the openings may be sealed immediately before the electrolyte is injected.

Figure 4A:
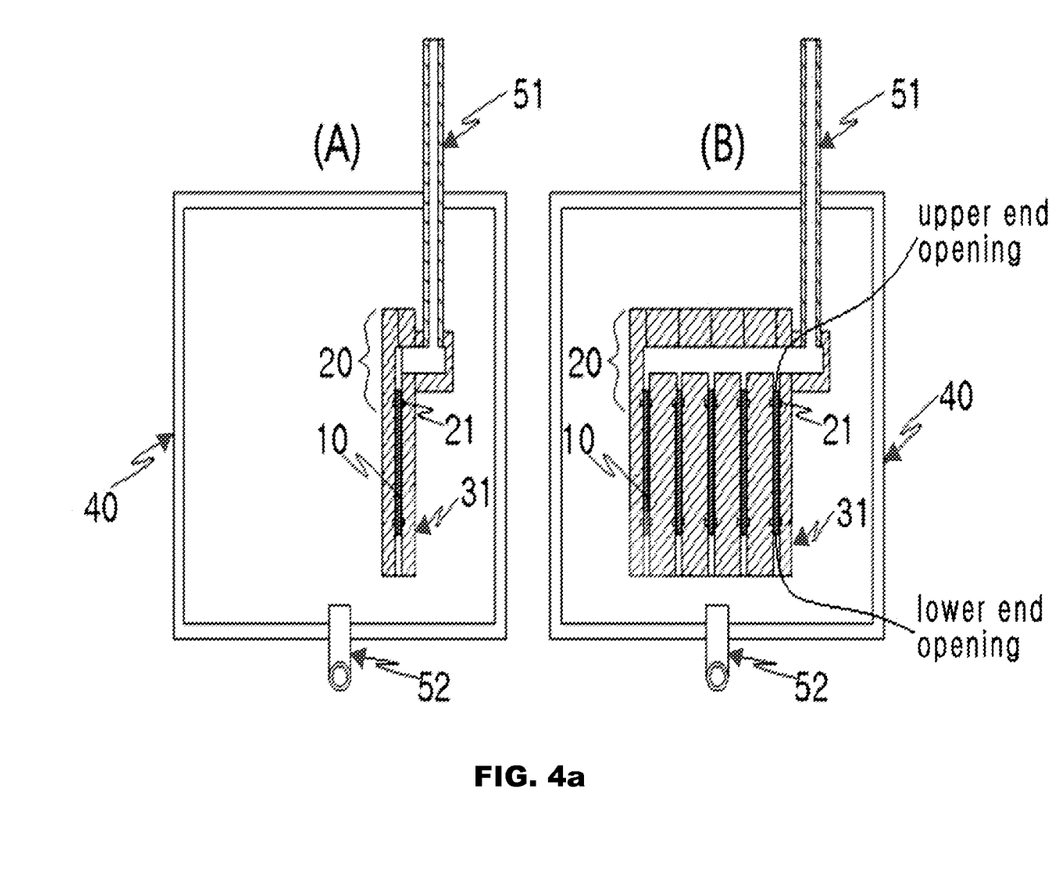
Figure 4B:
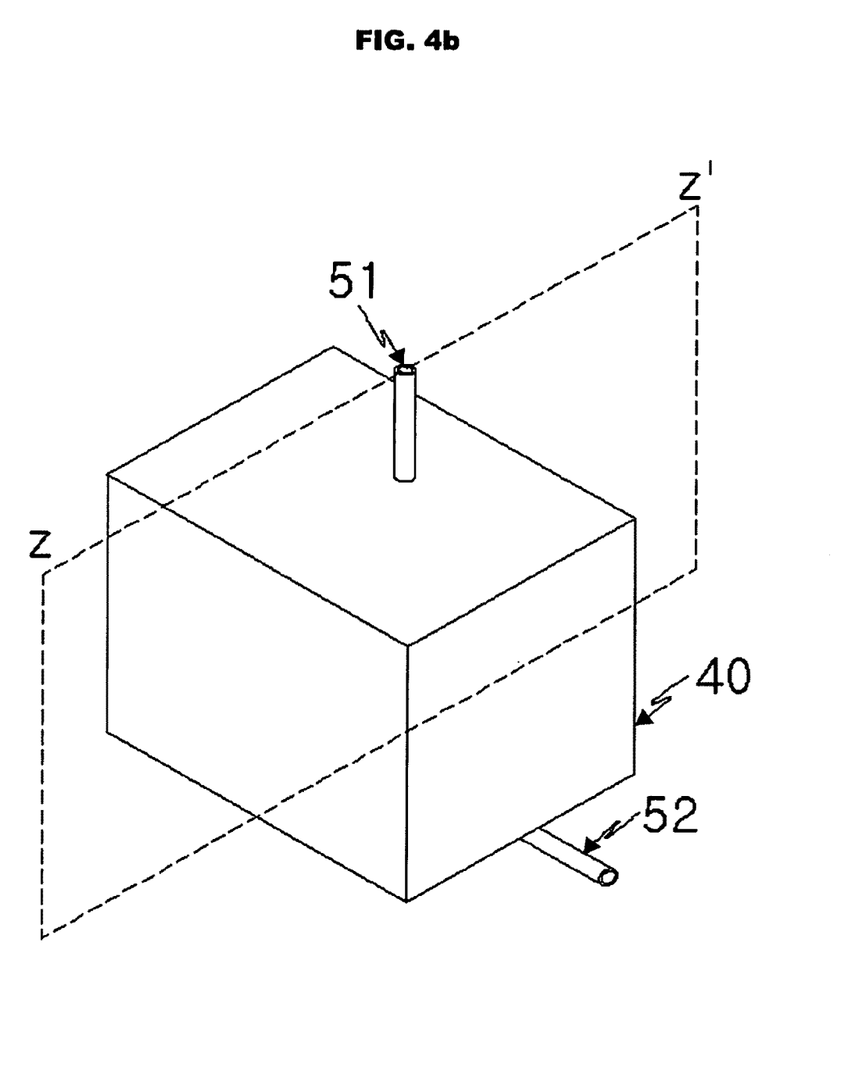
FIG. 4b is a perspective view showing that the connection between a circulation unit and a container of the apparatuses of FIGS. 4a(A) and 4a(B)
Figure 4C:
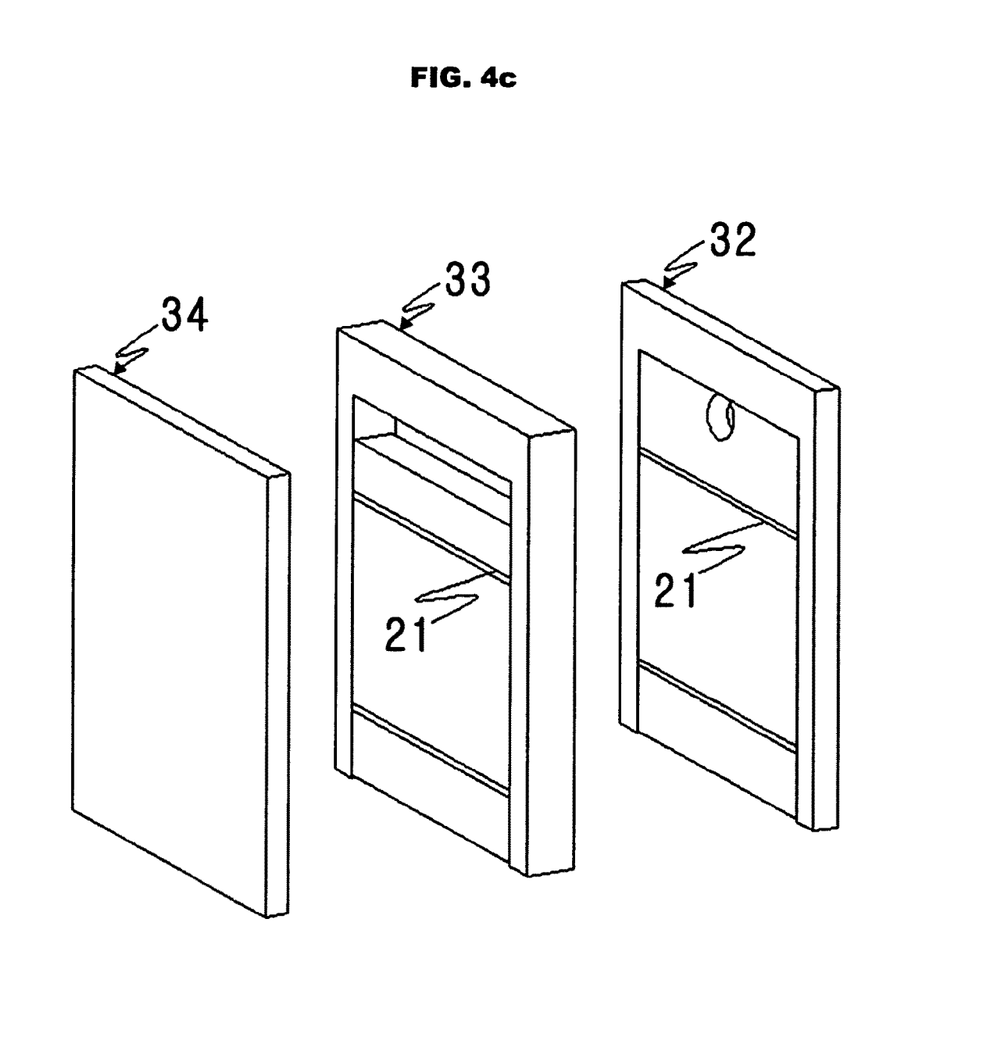
FIG. 4c shows the structure of the pre-cell panel unit of the apparatuses of FIGS. 4a(A) and 4(a)B.

FIGS. 2-4 show apparatuses for producing a DSSC according to embodiments of the present invention. In the drawings, the reference numbers 10, 11, 12, and 13 refer to a pre-cell panel, a transparent conductive substrate, an opposite electrode, and a porous oxide nanoparticle layer 13.

The apparatus of FIG. 2 includes a container 40 and a circulation unit 50.

The container 40 contains pre-cell panels 10, a solution transfer unit 20, and a dye solution. As shown in FIG. 2, the pre-cell panels 10 are aligned vertically at a predetermined position or positions within the container 40 by an appropriate support means (not shown) such as holding slots or mounting brackets. Although not shown, in an embodiment, the pre-cell panels 10 can be aligned horizontally at a predetermined position or positions within the container 40 by an appropriate support means (not shown) such as holding slots or mounting brackets.

The solution transfer unit 20 is provided for supplying dye solution to the pre-cell panels 10. The solution transfer unit 20 is provided at a position higher than the pre-cell panels, as shown in FIG. 2, such that the dye solution can be supplied to the upper opening of each of the pre-cell panels 10. In an embodiment, as shown in FIG. 3, the solution transfer unit 20 can be positioned to be connected to the upper portion or portions such that all dye molecules supplied from the supply unit 20 can be introduced to the upper end openings of the pre-cell panels. In another embodiment, although not shown, the solution transfer unit 20 can be positioned and connected horizontally with the pre-cell panels.

The circulation unit 50 is connected to the container 40 via the two or more openings of the container 40. The circulation unit 50 functions to circulate the dye solution to and from the solution transfer unit 20. A non-limiting example of the circulation unit 50 is a transfer tube coupled with a pump 50.

Suitably, the apparatus may further include a separate container for storing a washing solution (air). In an embodiment, however, the washing solution can be stored in the container 40, in which case the dye solution can be replaced with the washing solution at an appropriate step. For instance, after the step of adsorption of the dye solution is completed, the dye solution contained in the container can be replaced with the washing solution.

Also suitably, the apparatus may further include a separate circulation unit for the washing solution (air). In an embodiment, however, the washing solution can be circulated by the circulation unit 50.

The apparatus of FIG. 3 includes a container 40 and a circulation unit 50. The container 40 contains pre-cell panels 10, a solution transfer unit 20, and a dye solution.

As shown in FIG. 3, the pre-cell panels 10 are aligned vertically at a predetermined position or positions within the container 40 by an appropriate support means (not shown) such as holding slots or mounting brackets. Although not shown, in an embodiment, the pre-cell panels 10 can be aligned horizontally at a predetermined position or positions within the container 40 by an appropriate support means (not shown) such as holding slots or mounting brackets.

The solution transfer unit 20 has an outer wall and an inner cavity defined therein and is water-tightly connected to upper portions of the pre-cell panels 10 such that the upper openings of the pre-cell panels are positioned in the inner cavity. The water-tight connection can be provided by allowing the pre-cell panels 10 and the solution transfer unit 20 to be pressingly fixed to each other with a water-tightening means 21 such as a rubber or silicon strip or the like having resistance to the dye solution (and/or the washing solution). Likewise, the solution transfer unit 20 can be provided in the container 40 at a predetermined position by an appropriate support means (not shown) such as a holding slot(s) or a mounting bracket(s).

The circulation unit 50 is connected to the container 40 via the two or more openings of the container. The circulation unit 50 functions to circulate the dye solution to and from the solution transfer unit 20. A non-limiting example of the circulation unit 50 is a transfer tube coupled with a pump 50.

In this apparatus, the lower opening of each of the pre-cell panels 10 is submerged in the dye solution (or the washing solution) of the container 40. By setting the operation direction of the circulation unit 50, the flowing direction of the dye solution can be determined. That is, the dye solution can flow from bottom to top or from bottom to top. In case where the dye solution flows from top to bottom, the lower openings can either be submerged in the dye solution contained the container or be spaced from the dye solution FIGS. 4a(A) and 4a(B) show apparatuses according to other embodiments of the present invention. FIGS. 4a(A) and 4(B) are cross-sectional views taken along a plane passing along a line Z-Z' of FIG. 4b.

The apparatus of FIG. 4a(A) includes a single pre-cell panel within a container and the apparatus of FIG. 4a(B) includes two ore more pre-cell panels provided within the container 40. As shown in FIG. 4b, the container 40 is connected to a solution injection tube 51 and a solution discharge tube 52 of the circulation unit 50. The container 40 can be opened and closed by opening and closing means (not shown).

In more detail, the apparatus of FIG. 4a(A) includes a container 40 and a circulation unit 50 (not shown). The container 40 contains a pre-cell panel unit 31 and a dye solution (not shown). The circulation unit 50 is connected to the container 40 via the injection and discharge tubes 51, 52. The circulation unit 50 functions to circulate the dye solution to and from the pre-cell panel unit 31.

The pre-cell panel unit 31 includes a pre-cell panel 10 and a plurality of jigs. The pre-cell panel 10 and jigs are closely adhered in a water-tight state.

Preferably, the pre-cell panel unit 31 may include a front jig 32, a rear jig 34, and a pre-cell panel. The front jig 32 has an opening formed at an upper portion thereof. The opening is connected with the solution injection tube 51, thereby enabling the pre-cell panel unit 31 to be in fluid communication with the circulation unit 50. The rear jig 34 is not formed with such an opening or aperture since it serves as an outer wall. The pre-cell panel 10 is positioned between the front jig 32 and the rear jig 34.

Preferably, the pre-cell panel 10 and the jigs 32, are water-tightly adhered. The water-tight adhesion can be achieved by allowing the pre-cell panel 10 and the jigs 32, to be pressingly fixed to each other with a water-tightening means 21 such as a rubber or silicon strip or the like having resistance to the dye solution (or the washing solution). The pre-cell panel unit 31 can be provided at a predetermined position within the container 40 by an appropriate support means (not shown) such as a holding slot (s) or a mounting bracket(s).

Detailed description of the other structures and the operation of this apparatus is omitted since they are substantially same as those of the apparatuses shown in FIGS. 2 and 3.

Similar to the apparatus of FIG. 4a(A), the apparatus of FIG. 4a(B) includes a container 40 for containing a pre-cell panel unit 31 and a dye solution (not shown) and a circulation unit 50 (not shown) connected to the container 40 via the tubes 51, 52 for circulating the dye solution to and from the pre-cell panel unit 31.

Unlike the pre-cell panel unit 31 of the apparatus of FIG. 4a(A), the pre-cell panel unit 31 of the apparatus of FIG. 4a(B) includes pre-cell panels 10 and a plurality of intermediate jigs 33.

Preferably, the pre-cell panel unit 31 may include a front jig 32, a rear jig 34, and a plurality of intermediate jigs 33 between the front jig 32 and the rear jig 34. The front jig 32 has an opening formed at an upper portion thereof. The opening is connected with the solution injection tube 51, thereby enabling the pre-cell panel unit 31 to be in fluid communication with the circulation unit 50. Each of the intermediate jigs 33 has an aperture formed at an upper portion thereof such that the apertures can form an inner cavity when the jigs are assembled. The apertures are in fluid communication with the opening of the front jigs 32 and with the upper end openings of the pre-cell panels. In this apparatus, the inner cavity virtually functions as the solution transfer unit 20 of the above-described embodiments. The rear jig 34 is not formed with such an opening or aperture since it serves as an outer wall to allow the inner cavity to be defined when the jigs are assembled. Each of the pre-cell panels is provided between two of the jigs, 32, 33, 34.

Preferably, the pre-cell panels 10 and the jigs 32, 33, 34 are water-tightly adhered. The water-tight adhesion can be achieved by allowing the pre-cell panels 10 and the jigs 32, 33, 34 to be pressingly fixed to each other with a water-tightening means 21 such as a rubber or silicon strip or the like having resistance to the dye solution (or the washing solution). The pre-cell panel unit 31 can be provided at a predetermined position within the container 40 by an appropriate support means (not shown) such as a holding slot(s) or a mounting bracket(s).

Detailed description of the other structures and the operation of this apparatus is omitted since they are substantially same as those of the apparatuses shown in FIGS. 2 and 3.

According to the present invention, the adsorption of the dye molecules takes less time compared to that of a conventional method. Also, since the dye adsorbing step and the washing step, which are directly associated with the electrolyte injecting step, can be carried out in a single equipment, mass-production of the DSSC by the in-line process is enabled. Further, adsorption of dye molecules is conducted after the heat treatment or the like, thereby leading to an increase in stability of the dye, and hence improvement of the efficiency of the solar cell.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. An apparatus for producing a dye-sensitized solar cell, which includes a transparent electrode, an opposite electrode opposite the transparent electrode, and an electrolyte layer between the two electrodes, by performing a method comprising the steps of:
   (a) providing a pre-transparent electrode by coating oxide nanoparticles on a transparent conductive substrate and sintering the resulting transparent conductive substrate;
   (b) providing an opposite electrode by coating a transparent conductive substrate with platinum or carbon;
   (c) laminating the pre-transparent electrode and the opposite electrode such that the two electrodes are spaced apart by a predetermined interval from each other and the coated oxide nanoparticles and the coated platinum or carbon are positioned between the two electrodes, and then bonding the two electrodes at one or more predetermined portions such that the space between the two electrodes is in fluid communication with the outside;
   (d) supplying photosensitive dye molecules to the space between the two electrodes such that the photosensitive dye molecules are adsorbed onto the oxide nanoparticles;
   (e) supplying an electrolyte into the space between the two electrodes; and
   (f) hermetically sealing the electrodes,
   wherein the apparatus comprises:
   a container having outer walls on which at least one first opening and at least one second opening are formed and accommodating therein a liquid at a first position or positions therein and a pre-cell panel unit at a second position or positions therein, wherein the pre-cell panel unit comprises a front jig and a rear jig, and a pair of bonded electrodes between the front jig and the rear jig, the front jig has an opening formed at an upper portion thereof, and the rear jig is not formed with such an opening; and
   a circulation unit connected to opening of the front jig of the pre-cell panel unit through the first opening or openings of the container and to the liquid accommodated in the container through the second opening or openings of the container for circulating the liquid accommodated in the container to and from the pre-cell panel unit, wherein the pair of bonded electrodes has a space between the electrodes, and wherein the pair of bonded electrodes has at least one opening at one distal end thereof and has at least one opening at the other distal end thereof.

2. The apparatus according to claim 1, wherein the pre-cell panel unit comprises pairs of bonded electrodes, each of which has a space between the electrodes and has at least one opening at one distal end thereof and has at least one opening at the other distal end thereof, wherein the pre-cell panel unit further comprises a plurality of intermediate jigs between the front jig and the rear jig such that each of the pairs of bonded electrodes is positioned between two of the jigs, and wherein each of the intermediate jigs has an aperture formed at an upper portion thereof such that when the jigs are assembled, the apertures are in fluid communication with the opening of the front jig and with the distal end openings of the pairs of bonded electrodes.

* * * * *